(12) United States Patent
Delavy et al.

(10) Patent No.: US 8,290,794 B2
(45) Date of Patent: Oct. 16, 2012

(54) DEVICE FOR AUTOMATICALLY PROCESSING AND MONITORING DANGEROUS EVENTS

(75) Inventors: Claudine M. Delavy, London (GB); Michael Stahel, Raemismuehle-Zell (CH)

(73) Assignee: Swiss Reinsurance Company Ltd., Zürich (CH)

( * ) Notice: Subject to any disclaimer, the term of this patent is extended or adjusted under 35 U.S.C. 154(b) by 680 days.

(21) Appl. No.: 12/304,828

(22) PCT Filed: Jun. 13, 2006

(86) PCT No.: PCT/EP2006/063114
§ 371 (c)(1),
(2), (4) Date: Jun. 2, 2009

(87) PCT Pub. No.: WO2007/144021
PCT Pub. Date: Dec. 21, 2007

(65) Prior Publication Data
US 2009/0307012 A1    Dec. 10, 2009

(51) Int. Cl.
*G06Q 40/00* (2012.01)
(52) U.S. Cl. .............................. 705/4; 705/35
(58) Field of Classification Search .................. 705/4, 35
See application file for complete search history.

(56) References Cited

U.S. PATENT DOCUMENTS

| | | | | |
|---|---|---|---|---|
| 5,950,169 | A * | 9/1999 | Borghesi et al. | 705/4 |
| 2002/0035488 | A1 * | 3/2002 | Aquila et al. | 705/4 |
| 2002/0188480 | A1 * | 12/2002 | Liebeskind et al. | 705/4 |
| 2003/0083908 | A1 * | 5/2003 | Steinmann | 705/4 |
| 2004/0215494 | A1 * | 10/2004 | Wahlbin et al. | 705/4 |
| 2009/0119132 | A1 * | 5/2009 | Bolano et al. | 705/4 |
| 2010/0179451 | A1 * | 7/2010 | Hately et al. | 600/595 |

OTHER PUBLICATIONS

Lori Chordas. (Mar. 2006). In the Palm Of Your Hand. Best's Review, 106(11), 57-58,60,62. Retrieved Jun. 7, 2012.*

Robert Regis Hyle. (May 2006). Out and About :Agents and adjusters are free to roam the countryside untethered thanks to a variety of mobile and wireless devices, but as the number of devices and applications keeps increasing, smart insurers are taking a step back to assess their wireless strategy.Techdecisions for Insurance. Retrieve Jun. 7, 2012.*

* cited by examiner

*Primary Examiner* — Kito R Robinson
(74) *Attorney, Agent, or Firm* — Oblon, Spivak, McClelland, Maier & Neustadt, L.L.P.

(57) ABSTRACT

A single-stage or multi-stage damage coverage method and system for transport devices, including a central unit that includes a user factor and a central unit factor, the central unit storing backing amount parameters assigned to accumulable damage risks, the backing amount parameters being divisible by a split module with money amount values of a specified damage risk on the basis of the user factor and the central unit factor into backing amount parameters of the accumulable damage risks. The system includes one or more decentralized risk devices, the backing amount parameters being transmitted bidirectionally for one of the damage risks and corresponding compensation parameters between the one central unit and the one or more decentralized risk devices, and also includes an extrapolation module configured to specify one of the backing amount parameters and the compensation parameters of the specifiable damage risk for a future time interval.

15 Claims, 3 Drawing Sheets

DEVICE FOR AUTOMATICALLY PROCESSING AND MONITORING DANGEROUS EVENTS

The invention concerns a single-stage and/or multi-stage damage coverage system and a corresponding method for transport means devices, backing amount parameters for damage risks and/or corresponding compensation parameters being transmitted between a central unit and one or more decentralised risk devices. In particular, it concerns such a damage coverage system and corresponding method in association with a weighting or rating module, which includes weighting parameters which are accessible to a user.

Single-stage and/or multi-stage damage coverage systems have been known for a long time. However, such systems differ greatly in their conditions from one application area to another in the industry. Thus risks for coverage of catastrophic damage obey quite different tendencies from, for instance, risks in the automotive industry or the construction sector. In particular in the automotive industry, single-stage and/or multi-stage damage coverage systems are known in many variations in the prior art. Operation of vehicles, e.g. cars, lorries, boats, aircraft and similar is exposed to multiple risks. For instance, in the case of cars, use of a vehicle often brings risks such as accidents, wear and/or abrasion because of bad road conditions, environmental effects (e.g. hail etc.) and/or dangers for persons and property because of crimes, e.g. car theft, car hijacking, vandalism and violent attacks. More rarely than the risks listed above, the use of some vehicles can also bring risks for persons and property because of terrorist activities or combat operations, e.g. in geographical regions with military or political conflicts.

The owners and operators of vehicles carry the greatest part of the risk which is associated with the use of their vehicles. An owner and operator can minimise the risks by careful operation and correct assessment, e.g. by avoiding driving at night through districts with high criminality, in the interests of personal safety. However, in addition to the personal risks for the owner and/or operator, the use of a vehicle by an owner and/or operator can also affect other parties who have an economic interest in the vehicle or its operation. Such indirectly affected parties often have little or no monitoring of how the operator uses the vehicle, although these parties can be strongly affected by the use of the vehicle by the operator.

Damage coverage systems such as insurance systems which insure vehicles and/or operators, i.e. transfer the risk for the liability in the case of damage to themselves, normally require compensation for this assignment, e.g. in the form of a premium. The policies are often determined using elaborate actuarial methods. The actuarial methods often try, by means of appropriate rating devices, to approach the risk classification which is posed by different users of the damage coverage system, e.g. policy holders, so that on the basis of perceived risk classifications and/or ratings, the premiums can be assessed, and thus sufficiently high backing amounts for a risk of a device in the case of damage can be guaranteed. In other words, that all occurring claims in the case of damage can be covered.

Such a damage coverage system should also include the possibility of yielding a specifiable profit for oneself. It can be useful that the system is implemented in a dynamic and user-specific manner, so that, for instance, policy holders who in the past have had to make claims for cases of damage for a device and/or living creature have, for instance, caused the accidents and/or been penalised for speeding or other misdemeanours such as driving in a drunken state, and on the basis of these conditions are assigned user-specifically to a higher risk classification with correspondingly higher compensation parameters, e.g. premiums. This is known in the prior art.

Additionally, in particular in the case of vehicles, further user-specific parameters such as factors based on place of residence, e.g. the distance of the policy holder from work and the rate of vehicle theft where the holder lives, can be included user-specifically by the system in the assessment of the compensation, i.e. the premium. For instance, it can be assumed that persons who live in urban areas are exposed to a higher risk of vehicle theft than a person in a rural area. Such data based on the past can be helpful in the rating, e.g. for fixing the backing amounts and corresponding compensation and/or the risk to be expected. Nevertheless, it is obviously the case that such data cannot always include precisely incurred future risks of every policy holder.

Damage coverage systems usually have little monitoring or feedback about how and where a user operates his or her vehicle, for instance. For instance, whereas a policy holder can live in a comparatively safe area, he or she can drive into riskier areas, without the knowledge of the damage coverage system. A policy holder can also drive frequently into areas with a high accident density, and thus represent a higher risk of involvement in an accident. Despite all these user-specific uncertainties, it can be said that the data for damage risks with corresponding liabilities for the vehicle industry have been known relatively precisely for many years. Additionally, in many fields, large quantities of statistics concerning cases of damage are available, e.g. in the automotive industry, which is not necessarily the case in other areas of the vehicle industry, e.g. in the aircraft industry or space travel. Also other areas of damage coverage systems, e.g. damage coverage systems for catastrophic events such as earthquakes, hurricanes, floods etc.

Damage coverage systems with a partial risk hedging system onto capital markets, which if possible is not correlated, so-called Insurance-Linked Securities (ILS), have been known since the mid-1990s, and today show a capitalisation of eight to ten billion US dollars, which documents the great success of these systems.

The main representatives of ILS systems are based on so-called catastrophe bonds or cat bonds, which alone include a sum of over 6 billion US dollars (numbers from the year 2003). Although these systems were often laughed at initially, the growing acceptance by large investors worldwide shows their true importance. For insurance systems, reinsurance systems and an ever growing number of industry devices, by means of cat bonds multi-year hedging against natural catastrophes etc. can be effectively generated without the usual credit risk. Cat bond systems offer investors attractive returns and the possibility of reducing a portfolio risk, since cat bonds do not normally behave in correlation to other securities or financial instruments. Cat bonds are securities or investments which function in the same way, and the performance of which is based on the index of risks, which is based on natural catastrophes. Industry devices and systems from international companies to local insurance companies have used cat bonds to support or reduce their risks. Considered from the investor's side, cat bonds function as complete, multi-year and/or multi-stage damage coverage systems, like, for instance, reinsurance systems.

As mentioned, such systems are known in the prior art, and implemented in various ways. However, in classic reinsurance systems, systems in the field of catastrophic risk or corresponding damage coverage function in a fundamentally different way from, for instance, multi-stage damage coverage systems in the vehicle industry. In damage coverage for cases of catastrophe, multi-stage damage coverage systems usually function in such a way that the first stage, in times without an exceptional damage event, covers cases of damage in full or at least almost in full.

The second stage covers, from a predefined first threshold, without limit or up to a second predefined threshold, the damage if exceptional damage events occur. This does not apply to damage coverage systems in the vehicle industry. Since damage risks in the vehicle industry occur on the basis of a large number of relatively small risks with stable probability of occurrence over the years, the variance, i.e. the fluctuations, of the accumulated damage sums per year is very small.

Multi-stage systems here are therefore mostly based on so-called quota-sharing systems. This means that the different stages of the damage coverage systems function on an equal footing with each other, and the damage which occurs is divided among the different stages according to the predetermined quota. Consequently, a technically similar application of cat bond systems does not come into question here, since the risks are very precisely known and in the normal case fluctuations only occur in small orders of magnitude. Nevertheless, it is a requirement of the vehicle industry to support its risks by means of such systems and devices, to free its own capital.

It is an object of this invention to propose for the vehicle industry single-stage or multi-stage damage coverage systems which do not have the above-mentioned disadvantages. In particular, it should be a solution which makes it possible to form single-stage or multi-stage systems for damage coverage in such a way, by means of an automated link to the capital market, that an uncorrelated bond exists, and makes it possible to free tied-up capital and use it for other purposes.

According to this invention, this aim is achieved, in particular, by the elements of the independent claims. Other advantageous embodiments also result from the dependent claims and description.

In particular, these aims are achieved by the invention in that in the single-stage and/or multi-stage damage coverage system for transport means devices, backing amount parameters for damage risks and/or corresponding compensation parameters are transmitted between a central unit and one or more decentralised risk devices, that backing amount parameters and/or compensation parameters of accumulable damage risks of a specifiable future time interval are specified to an extrapolation module, the central unit divides backing amount parameters with money amount values of accumulable damage risks by means of a specifiable user factor and a central unit factor, that the backing amount parameters are stored corresponding to the specifiable central unit factor and assigned to the accumulable damage risks, the central unit transmitting the compensation parameters for the corresponding backing amount parameters of accumulable damage risks to a first memory unit of a first damage coverage system, that money amount values based on the specifiable user factor are transmitted by user modules to a second memory unit of a second damage coverage system and stored assigned to the accumulable damage risks, that the central unit, if damage events have occurred in the time interval, transmits first charging data with charging parameters for crediting money amount values to a risk device, assigned to a clearing module, the transmitted money amount values being decremented by the first memory unit, and if the first memory unit includes no further money amount values, being decremented by the second memory unit, that second charging data with charging parameters are transmitted to a clearing module, assigned to a user module, for crediting money amount values on the basis of a specifiable risk compensation factor, and that third charging parameters with charging parameters are transmitted to a clearing module, assigned to the user module, for crediting money amount values on the basis of the money amount values of the second memory unit and the risk compensation factor, if the second memory unit contains money amount values after the expiry of the time interval.

The invention has the advantage, among others, that an uncorrelated risk support becomes possible even in single-stage and/or multi-stage damage coverage systems with relatively small risk fluctuations, e.g. in the automotive industry, but in particular in the case of single-stage and/or multi-stage damage coverage systems based on quota sharing. Until now, this has not been possible or approximately implemented with any system of the prior art. Among other things, by means of the system, resources (e.g. financial resources) which would otherwise be tied up for securing backing amounts can be freed for other purposes, without the clean risk cover being lost.

A further advantage is that with an additional cover it is possible, by means of the system according to the invention, to achieve a specified rating or increase a rating without additional resources consequently having to be tied to the device. Since the risks of exposure in the automotive industry are recorded with relatively high precision, with the system according to the invention compensation parameters and/or backing amount parameters can be additionally optimised, not only by risks not being supported in a correlated manner, but also, by a further capital gain being possible by means of the released resources. This is not possible in this way with any system of the prior art.

In a variant embodiment, the single-stage and/or multi-stage damage coverage system for transport means devices includes at least one central unit and one or more decentralised risk devices, with backing amount parameters which can be transmitted bidirectionally for damage risks and/or corresponding compensation parameters, and an extrapolation module for specifying the backing amount parameters and/or compensation parameters of a specifiable damage risk for a future time interval, said central unit including a user factor and a central unit factor, the backing amount parameters being divisible by means of a split module with money amount values of the specified damage risk on the basis of the user factor and central unit factor into backing amount parameters of accumulable damage risks, and it being possible to store the backing amount parameters assigned to the accumulable damage risks, said damage coverage system including a first memory unit of a first damage coverage system, it being possible to transmit the compensation parameters for the corresponding backing amount parameters of accumulable damage risks assigned to the central unit factor from the central unit to the first memory unit of the first damage coverage system, said damage coverage system including a second memory unit of a second damage coverage system, user modules being able to transmit money amount values on the basis of the specifiable user factor to a second memory unit of a second damage coverage system, and it being possible to store the money amount values assigned to the accumulable damage risks, it being possible to transmit first charging data with charging parameters in the case of damage events occurring in the time interval for crediting money amount values from the central unit to a clearing module, assigned to a risk device, the first memory unit being able to decrement said transmitted money amount values, and if the first memory unit includes no further money amount values, the second memory unit being able to decrement said transmitted money amount values, the damage coverage system including second charging data, it being possible to transmit the second charging parameters for crediting money amount values on the basis of a specifiable risk compensation factor to a clearing module, assigned to a user module, and it being possible to transmit third charging parameters with charging parameters for crediting money amount values on the basis of the money amount values of the second memory unit and the risk compensation factor to a clearing module, assigned to the user module, if the second memory unit contains money amount values after the expiry of the time interval. This variant embodiment has the same advantages as the previous one, among others.

In a variant embodiment, the money amount values of the first and/or second memory module are transmitted during the available time to a financial institution, compensation parameters corresponding to the transmitted money amount values being transmitted by the financial institution to the first and/or second memory unit after the specifiable time interval. This variant embodiment has the advantage, among others, that an additional acquisition of resources is made possible by profits/yields on the basis of compensation parameters for money amount values of the first and/or second memory module being made available. Among other things, this makes possible a further optimisation of the backing amounts and/or compensation parameters.

In another variant embodiment, at least one of the user modules includes sub-modules of different risk classes with different risk compensation factors and/or different transmission condition parameters for transmitting money amount values. The sub-modules can be assigned, e.g. changeably from the second memory unit, in particular dynamically changeably as an embodiment according to a user profile. This variant embodiment has the advantage, among others, that a staged distribution or transmission of the third charging parameters with charging parameters for crediting money amount values on the basis of the money amount values of the second memory unit and the risk compensation factor are transmitted to a clearing module, assigned to the user module, if the second memory unit contains money amount values after the expiry of the time interval.

In another variant embodiment, the central unit includes a monitoring module, it being possible to compare the risk compensation factor with compensation parameters on the basis of the accumulated money amount values of the second memory unit, and if the risk compensation factor is detected to be less than the compensation parameters within a definable threshold value, the second damage coverage system is activated. This variant embodiment has the advantage, among others, that a staged risk with correspondingly staged compensation parameters can be offered to users of the user modules. This has the further advantage that it can be better adapted to different user requirements. This also makes it possible to address an extended range of users with the offer.

In a variant embodiment, the damage coverage system is linked and synchronised with a further damage coverage system which is based on a quota sharing parameter for the damage risks. This variant embodiment has the advantage, among others, that even multi-stage systems can be captured and supported with the system according to the invention. However, a damage coverage system based on quota sharing involves parallel stages, in contrast to multi-stage systems, e.g. for damage coverage for catastrophic risks such as floods, hurricanes, earthquakes and/or terrorist attacks. Such support of such systems was not possible in the prior art until now.

In another variant embodiment, by means of a weighting module, at least one variable weighting parameter is determined on the basis of the backing amount parameters and the maximum possible damage sum. By means of an interface of the weighting module, the at least one variable weighting parameter can be transmitted by the user, e.g. via a network, to mobile and/or stationary network nodes. The weighting module can be implemented in hardware and/or software, for instance, and in particular include appropriate neural network modules and/or automated expert modules. This variant embodiment has the advantage, among others, that it makes full automation of the system possible. That was not known in the prior art, and nor were there any indications that it was at all technically possible or could be implemented.

At this point, it should be established that this invention refers, as well as to the method according to the invention, to a system for executing this method, and to a corresponding computer program product.

Below, variant embodiments of this invention are described on the basis of examples. The examples of the embodiments are illustrated by the following attached figures:

FIG. 1 shows a block diagram, which shows schematically an embodiment of a single-stage or multi-stage system 80 according to the invention for transport means devices 41, backing amount parameters for damage risks and/or corresponding compensation parameters being transmitted between a central unit 10 and one or more decentralised risk devices 40.

FIG. 2 shows a so-called Net Present Value (NPV) cash flow distribution of a system according to the invention. The NPV corresponds to the present sum of the annual cash flow, minus the initially activated investments, i.e. minus the initially stored money amount values. The annual cash flow corresponds to the net profit (compensations−costs) which is generated during its lifetime on the basis of the initial money amount values. This cash flow is adapted or standardised to the uncertainty and/or fluctuations over time of the effective value of the money amount values on the market.

Figure 1:
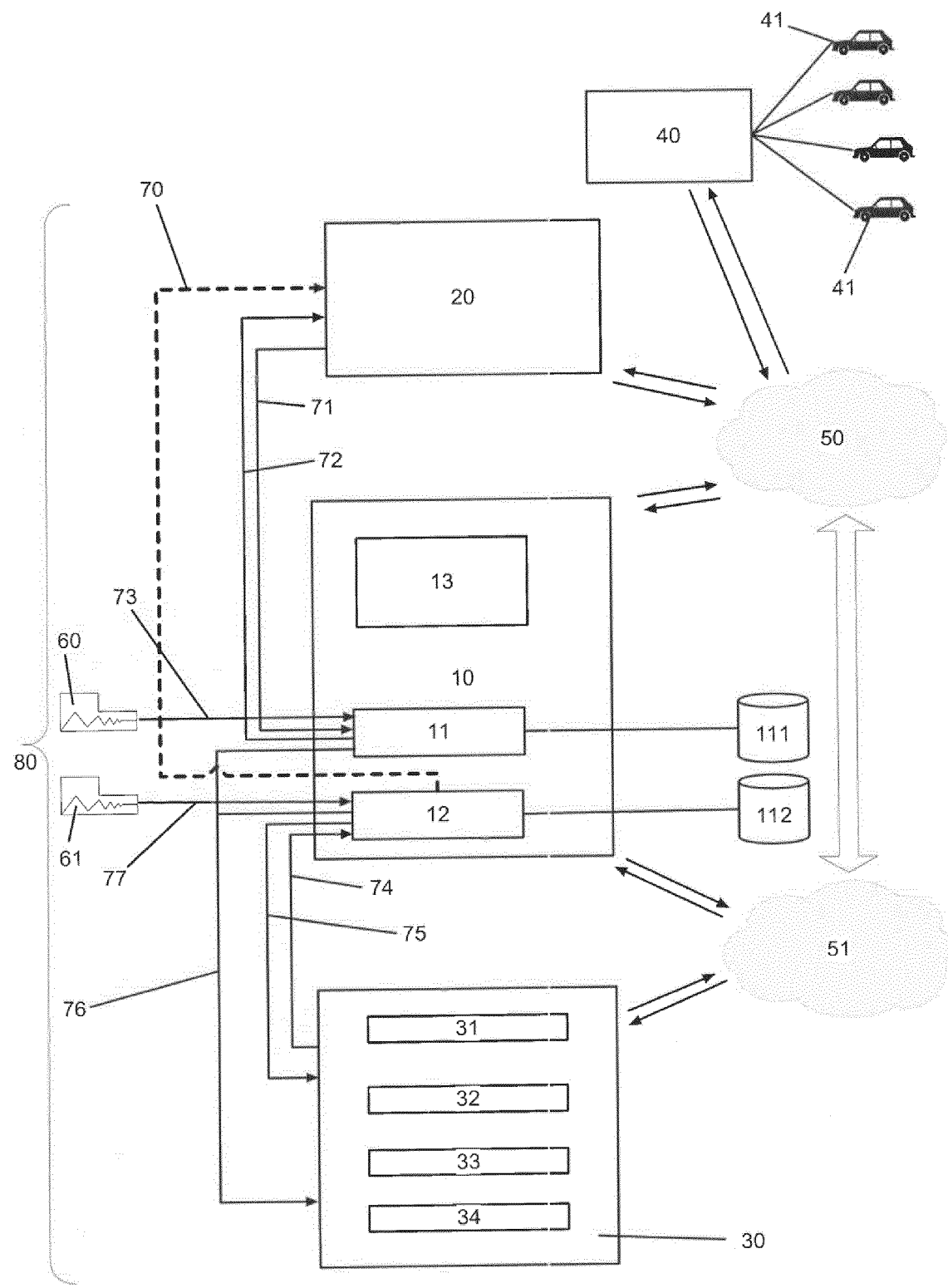
Figure 2:
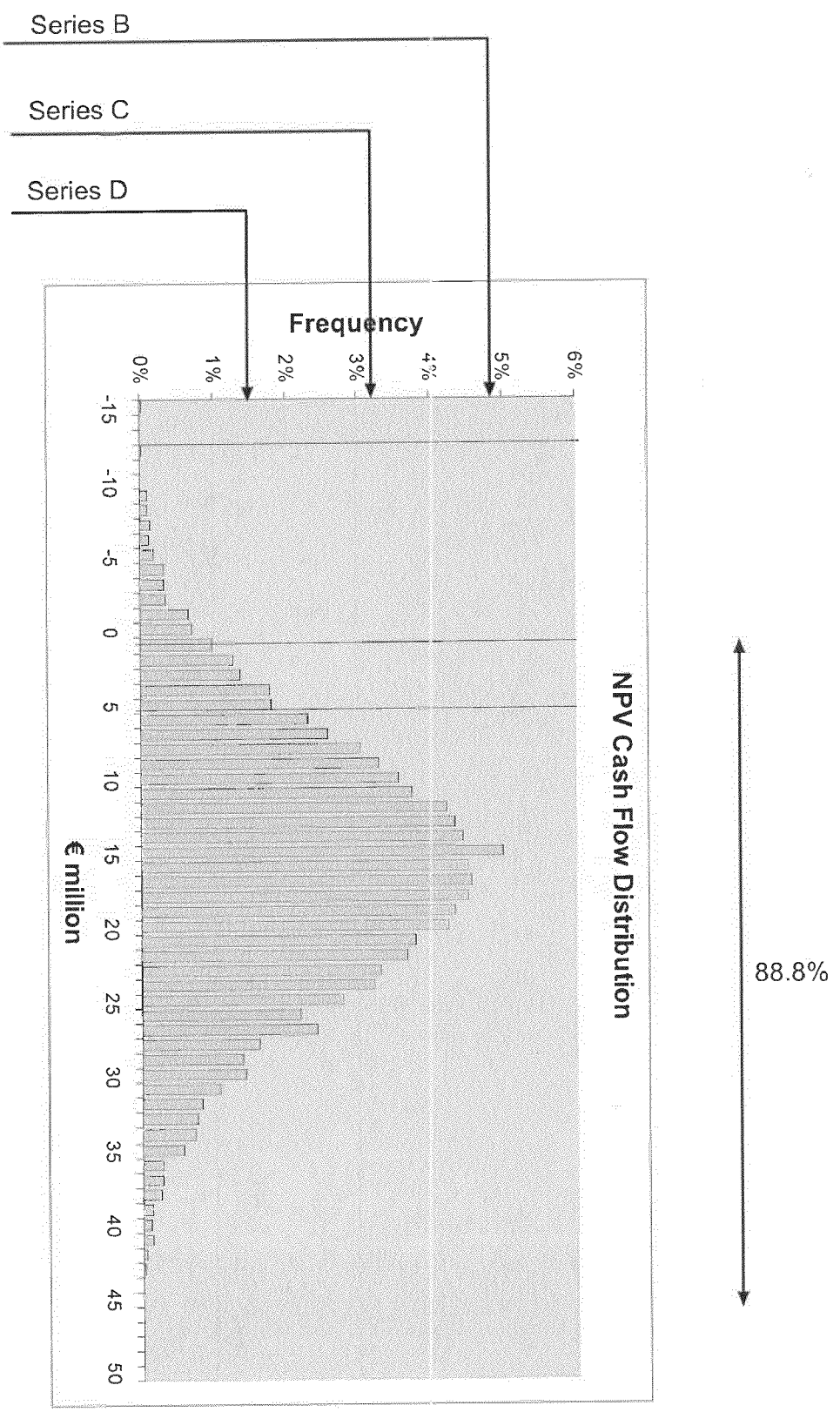
Figure 3:
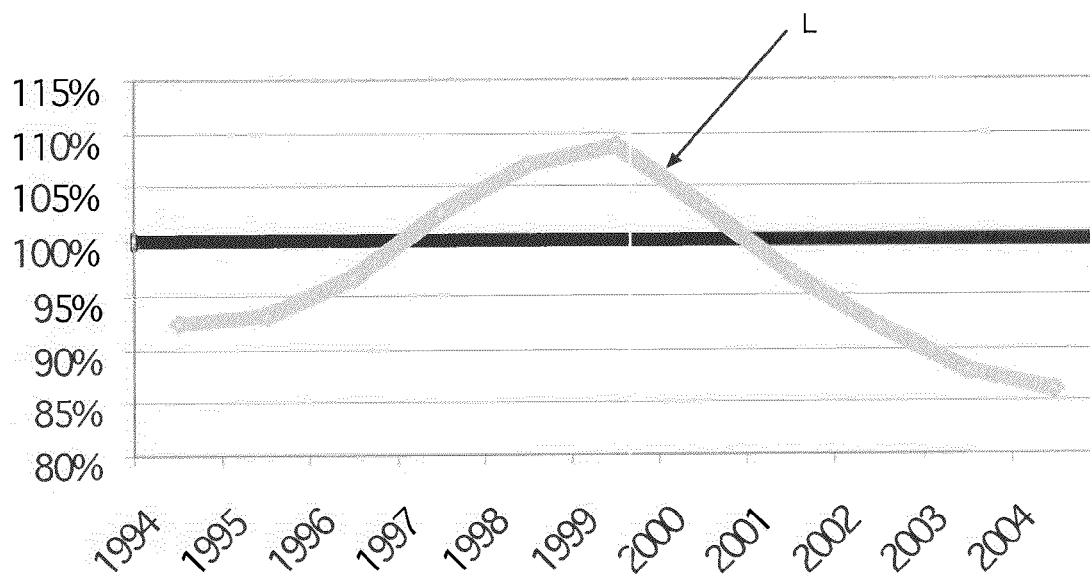
FIG. 3 shows the ratio of damage coverage to premiums in the case of damage coverage to third parties (Third Party Liabilities, TPL). In the year 2004, with a possible embodiment of the invention, it was about 86%.
Figure 4:
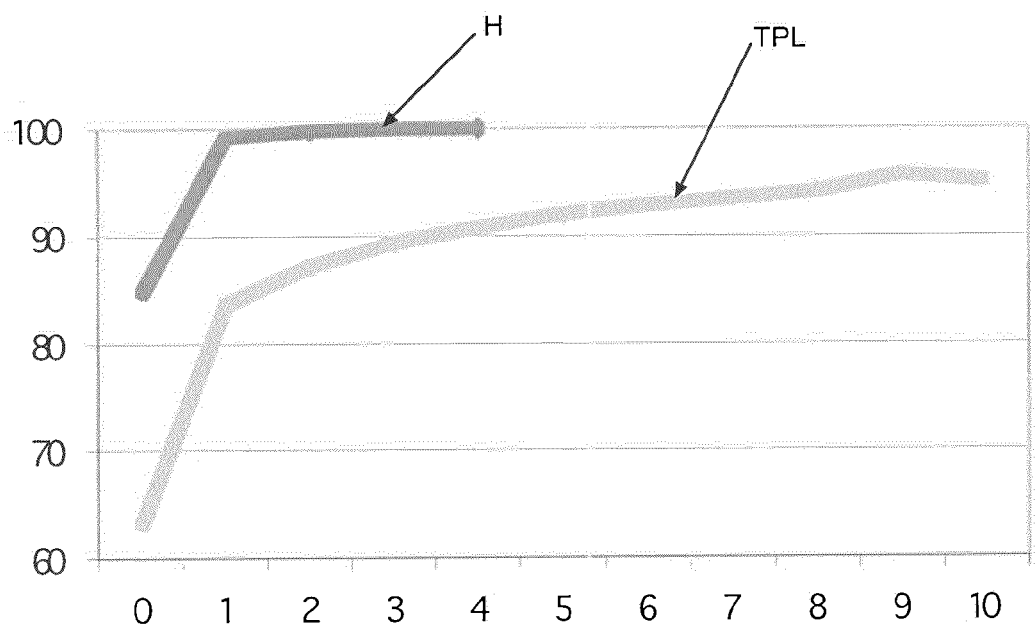
FIG. 4 shows, with the H line, the own damage liabilities, and with the TPL line, the liabilities to third parties, depending on the years for a single-stage and/or multi-stage damage coverage system 80 for transport means devices 41.

FIG. 1 shows a architecture which can be used to implement the invention. In this embodiment, for the single-stage and/or multi-stage damage coverage system 80 for transport means devices 41, backing amount parameters for damage risks and/or corresponding compensation parameters are transmitted between a central unit 10 and one or more decentralised risk devices 40. The damage coverage system 80 can, for instance, be linked and synchronised with one or more further damage coverage systems 80, which are based on a quota sharing parameter for the damage risks.

This is known, for instance, in multi-stage damage coverage systems, in particular in the automotive and vehicle industry. Since relatively small fluctuations of the annually accumulated damage claims are normal, second stages of the damage coverage system, e.g. reinsurance systems, take over damage claims according to a fixed quota parameter which is synchronised in advance between the systems.

By means of an extrapolation module 13 of the central unit 10, backing amount parameters and/or compensation parameters of accumulable damage risks of a specifiable future time interval are determined. The extrapolation module 13, like the other units according to the invention, can be implemented in hardware and/or software.

The central unit 10 divides backing amount parameters with money amount values of accumulable damage risks by means of a specifiable user factor and a central unit factor. The backing amount parameters are stored corresponding to the specifiable central unit factor and assigned to the accumulable damage risks.

The central unit 10 transmits 71 the compensation parameters (in the case of insurance systems and/or reinsurance systems these can be, for instance, the agreed premium parameters and/or corresponding money amount values) for the corresponding backing amount parameters of accumulable damage risks to a first memory unit 111 of a first damage coverage system 11.

Money amount values based on the specifiable user factor are transmitted 74 by user modules 30 to a second memory unit 112 of a second damage coverage system 12 and stored assigned to the accumulable damage risks.

In a variant embodiment, for instance the money amount values of the first 73 and/or second 77 memory module 111/112 can be transmitted during the available time to a financial institution 60/61. The financial institution 60/61 can be, for instance, a bank and/or stock exchange and/or investor. Compensation parameters, e.g. interest and/or other returns on the invested money amount values, corresponding to the transmitted money amount values, are transmitted by the financial institution 60/61 to the first and/or second memory unit 111/112 after the specifiable time interval, and stored by the central unit 10, added to the previously stored parameters.

In the case of damage events occurring in the time interval, the central unit 10 transmits first charging data with charging parameters for crediting money amount values to a risk device 40, assigned to a clearing module. The first memory unit 111 decrements 72 the transmitted money amount values, or the first memory unit 111 decrements 72 the stored money amount values, and if the first memory unit 111 includes no further money amount values, they are decremented 70 by the second memory unit 112. Second charging data with charging parameters for crediting money amount values are transmitted 76, on the basis of a specifiable risk compensation factor, to a clearing module, assigned to a user module 30. Third charging parameters with charging parameters for crediting money amount values on the basis of the money amount values of the second memory unit 112 and the risk compensation factor are transmitted 75 to a clearing module, assigned to the user module 30, if the second memory unit 112 contains money amount values after the expiry of the time interval.

The charging data and/or parameters corresponding to the compensation parameters and/or backing amounts and/or notifications of claims can in general be generated by the central unit 10 or the damage coverage system 80, but also, for instance, by the financial institution or a resource of a user. The charging data and/or compensation parameters can include, for instance, charging vouchers (e.g. electronically signed), similar to CDR (Call Data Record) vouchers in the case of so-called DUR (DAB/DVB Usage Record) vouchers. The charging vouchers are transmitted to a clearing module, for instance. The clearing module can also be associated in a decentralised manner with third parties such as a credit card company. By means of the clearing module, the charging data is further processed, or the above-mentioned systems (central unit 10, damage coverage system 80, user resource etc.) do the charging autonomously.

Optimally, by means of a repackaging module, the payment-oriented and/or clearing-module-specific charging data can also be provided with an electronic stamp, an electronic signature or an electronic watermark. The electronic signature makes it possible to assign the charging data at any later time to the appropriate system and/or device.

In a special variant embodiment, it can be useful that submodules 31/32/33/34 of different risk classes, with different risk compensation factors and/or different transmission condition parameters for transmitting money amount values from the second memory unit 112, are assigned to the user module 30.

To achieve further automation, which in particular also makes dynamic adaptation of the system 80 according to the invention possible, the central unit 10 can include a monitoring module, for instance. The monitoring module acts as a trigger device, and can be implemented in hardware and/or software. By means of the monitoring module, the risk compensation factor is compared with compensation parameters based on the accumulated money amount values of the second memory unit 112, and if the risk compensation factor is detected to be less than the compensation parameters within a definable threshold value, the second damage coverage system 12 is activated.

To make feedback and/or monitoring possible for a user, at least one variable weighting parameter based on the backing amount parameters and the maximum possible amount of damages can be determined, e.g. by means of a weighting module. The weighting parameter can be adapted to a rating method which is generally known in the prior art for assessing persons, objects or companies, and/or be standardised to such a method. For instance, since the users come from the capital market side, it can be important to use a rating method which is known in the banking sector for standardisation. To assess the ability of a debtor to pay, rating codes are used. The classification can be determined by the bank's own criteria, or those of internationally active rating agencies such as Moody's, Standard & Poor's, or Fitch. For instance, the well-known AAA can stand for a high creditworthiness, and C or even D for a very bad one.

The individual category designations can differ from one agency to another. For instance, Moody's uses numeric suffixes, e.g. A1, A2, A3; whereas at Standard & Poor's the "+" and "−" symbols are appended, e.g. B+, B, B−. The system 80 can, for instance, carry out a user-specific standardisation dynamically according to a user profile for a user. There can be ratings for both companies and states. For instance, Austria has an AAA rating.

Incidentally, normally a company can never achieve a better rating than the state in which it is based. In the prior art, it is usually the case that a debtor with a better rating can acquire capital on better conditions. On the other hand, it is also true that a better return can be obtained from debtors with a bad rating, although the probability of a payment failure (creditworthiness risk) is much higher. It is therefore important to mention that a downgrading regarding the rating often has a catastrophic effect on both companies and states, which must suddenly offer more return for their capital requirements. Incidentally, there were therefore often fierce arguments between the rating agency and the assessed systems and/or companies about the rating.

This of course also applies to the damage coverage system 80 according to the invention. For a good rating, the accumulated money amount values of the first memory unit 11 and second memory unit 12 and the backing amounts of the central unit 10 are relevant. To be as attractive as possible for possible users of the user modules 30, i.e. investors, for instance the size of the money amount values of the second memory unit 12 can be adjusted. Simultaneously, of course, internal resources which are tied up as the backing amount, such as stored money amount values, can be reduced by means of the system 80 and/or with an adjustment of the money amount values of the second memory unit 12, and released for other functions.

Part of this is that resources which become newly available with the system 80 are compared, as mentioned, with compensation parameters, e.g. of capital markets, and adjusted accordingly. Incidentally, it is important to point out that although the costs of the rating are normally borne by the company to be assessed, it is nevertheless usually better to have a bad rating than none, since many investors ignore debtors with no rating. Particularly in the USA, the rating already has a long tradition, and it is as good as impossible to obtain capital without a rating. Most famous European companies are therefore now included in the rating.

By means of an interface of the weighting module, via a network 50/51, for instance the at least one variable weighting parameter can be transmitted to mobile and/or stationary network nodes of the user. The user can thus monitor dynamically the user modules 30 which are assigned to him or her. It is even conceivable that the user, on the basis of the weighting parameters, can adjust his or her assignment to one or more sub-modules 31/32/33/34 dynamically.

The communication networks 50/51 include, for instance, a GSM or UMTS network, or a satellite-based mobile communication network, and/or one or more fixed networks, e.g. the public switched telephone network, the world-wide Internet or a suitable LAN (Local Area Network) or WAN (Wide Area Network). In particular, it also includes ISDN and XDSL connections.

The invention claimed is:

1. A single-stage or multi-stage damage coverage system for transport devices, said damage coverage system comprising:

at least one central unit including a user factor and a central unit factor, the central unit configured to store backing amount parameters assigned to accumulable damage risks, the backing amount parameters being divisible by a split module with money amount values of a specified damage risk on the basis of the user factor and the central unit factor into backing amount parameters of the accumulable damage risks;

one or more decentralized risk devices, the backing amount parameters being transmitted bidirectionally for one of the damage risks and corresponding compensation parameters between the at least one central unit and the one or more decentralized risk devices;

an extrapolation module configured to specify one of the backing amount parameters and the compensation parameters of the specifiable damage risk for a future time interval;

a first memory unit of a first damage coverage device, which communicates with a first financial institution, the first memory unit configured to receive the compensation parameters for the corresponding backing amount parameters of the accumulable damage risks assigned to the central unit factor from the central unit;

a second memory unit of a second damage coverage device, which communicates with a second financial institution, the second memory unit configured to receive money amount values on the basis of the specifiable user factor transmitted from user modules, and configured to store the money amount values assigned to the accumulable damage risks, wherein the central unit is configured to transmit first charging data with charging parameters in response to damage events occurring in the time interval for crediting money amount values to a clearing module, which is assigned to the one or more decentralized risk devices, the first memory unit decrementing the transmitted money amount values, and the second memory unit decrementing said transmitted money amount values in response to the first memory unit including no further money amount values, the central unit is configured to transmit second charging parameters for crediting money amount values on the basis of a specifiable risk compensation factor to a clearing module, which is assigned to one of the user modules, and the central unit is configured to transmit third charging parameters with charging parameters for crediting money amount values on the basis of the money amount values of the second memory unit and the risk compensation factor to the clearing module, which is assigned to the one of the user modules, in response to the second memory unit containing money amount values after expiration of the time interval.

2. The damage coverage system according to claim 1, wherein the money amount values of one of the first and the second memory unit are transmitted during an available time to one of the first financial institution and the second financial institution, and the compensation parameters corresponding to the transmitted money amount values are transmitted by the one of the first financial institution and the second financial institution to a corresponding one of the first and second memory unit after the specifiable time interval.

3. The damage coverage system according to claim 1, wherein at least one of the user modules includes sub-modules of different risk classes with one of different risk compensation factors and different transmission condition parameters for transmitting money amount values.

4. The damage coverage system according to claim 1, wherein the central unit includes a monitoring module configured to compare the risk compensation factor with the compensation parameters on the basis of the accumulated money amount values of the second memory unit, and the second damage coverage system is activated in response to the risk compensation factor being detected to be less than the compensation parameters within a definable threshold value.

5. The damage coverage system according to claim 1, wherein the damage coverage system is linked and synchronized with another damage coverage system that is based on a quota sharing parameter for the damage risks.

6. The damage coverage system according to claim 1, further comprising: a weighting module configured to determine a variable weighting parameter on the basis of the backing amount parameters and a maximum possible damage sum.

7. The damage coverage system according to claim 6, wherein the weighting module includes an interface, via which the variable weighting parameters are transmitted by a user to one of mobile and stationary network nodes.

8. A method for single-stage or multi-stage damage coverage systems for transport devices, backing amount parameters being transmitted for one of damage risks and corresponding compensation parameters between a central unit and one or more decentralized risk devices, the method comprising:

determining, by an extrapolation module of the central unit, one of backing amount parameters and compensation parameters of accumulable damage risks of a specifiable future time interval;

dividing, by the central unit, the backing amount parameters with money amount values of accumulable damage risks by a specifiable user factor and a central unit factor, the backing amount parameters being stored corresponding to the specifiable central unit factor and assigned to the accumulable damage risks;
transmitting, by the central unit, the compensation parameters for the corresponding backing amount parameters of accumulable damage risks to a first memory unit of a first damage coverage device, which communicates with a first financial institution;
transmitting money amount values based on the specifiable user factor by user modules to a second memory unit of a second damage coverage device, which communicates with a second financial institution, and storing the money amount values assigned to the accumulable damage risks;
transmitting, by the central unit, in response to damage events occurring in the time interval, first charging data with charging parameters for crediting money amount values to the one or more decentralized risk devices, which is assigned to a clearing module, the transmitted money amount values being decremented by the first memory unit, and being decremented by the second memory unit in response to the first memory unit including no further money amount values;
transmitting second charging data with charging parameters to a clearing module, which is assigned to one of the user modules, for crediting money amount values on the basis of a specifiable risk compensation factor; and
transmitting third charging parameters with charging parameters to the clearing module, which is assigned to the one of the user modules, for crediting money amount values on the basis of the money amount values of the second memory unit and the risk compensation factor, in response to the second memory unit containing money amount values after expiration of the time interval.

9. The method according to claim 8, further comprising:
transmitting, during an available time to one of the first financial institution and the second financial institution, the money amount values of one of the first and second memory unit, and
transmitting, by the one of the first financial institution and the second financial institution to a corresponding one of the first and second memory unit after the specifiable time interval, the compensation parameters corresponding to the transmitted money amount values.

10. The method according to claim 8, further comprising: assigning, to at least one of the user modules, sub-modules of different risk classes with one of different risk compensation factors and different transmission condition parameters for transmitting money amount values from the second memory unit.

11. The method according to claim 8, further comprising:
comparing, using a monitoring module included in the central unit, the risk compensation factor with compensation parameters on the basis of the accumulated money amount values of the second memory unit, and
activating the second damage coverage system in response to the risk compensation factor being detected to be less than the compensation parameters within a definable threshold value.

12. The method according to claim 8, further comprising: linking and synchronizing the damage coverage system with another damage coverage system that is based on a quota sharing parameter for the damage risks.

13. The method according claims 8, further comprising: determining, by a weighting module, at least one variable weighting parameter on the basis of the backing amount parameters and a maximum possible damage sum.

14. The method according to claim 13, further comprising: transmitting, by a user via a network, using an interface of the weighting module, the at least one variable weighting parameter to one of mobile and stationary network nodes.

15. A non-transitory computer readable medium including computer executable instructions, wherein the instructions, when executed by a computer, cause the computer to perform a method for single-stage or multi-stage damage coverage systems for transport devices, backing amount parameters being transmitted for one of damage risks and corresponding compensation parameters between a central unit and one or more decentralized risk devices, the method comprising:
determining, by an extrapolation module of the central unit, one of backing amount parameters and compensation parameters of accumulable damage risks of a specifiable future time interval;
dividing, by the central unit, the backing amount parameters with money amount values of accumulable damage risks by a specifiable user factor and a central unit factor, the backing amount parameters being stored corresponding to the specifiable central unit factor and assigned to the accumulable damage risks;
transmitting, by the central unit, the compensation parameters for the corresponding backing amount parameters of accumulable damage risks to a first memory unit of a first damage coverage device, which communicates with a first financial institution;
transmitting money amount values based on the specifiable user factor by user modules to a second memory unit of a second damage coverage device, which communicates with a second financial institution, and stored storing the money amount values assigned to the accumulable damage risks;
transmitting, by the central unit, in response to damage events occurring in the time interval, first charging data with charging parameters for crediting money amount values to the one or more decentralized risk devices, which is assigned to a clearing module, the transmitted money amount values being decremented by the first memory unit, and being decremented by the second memory unit in response to the first memory unit including no further money amount values;
transmitting second charging data with charging parameters to a clearing module, which is assigned to one of the user modules, for crediting money amount values on the basis of a specifiable risk compensation factor; and
transmitting third charging parameters with charging parameters to the clearing module, which is assigned to the one of the user modules, for crediting money amount values on the basis of the money amount values of the second memory unit and the risk compensation factor, in response to the second memory unit containing money amount values after expiration of the time interval.

* * * * *